No. 720,681. PATENTED FEB. 17, 1903.
M. DERRIG.
BARREL HOLDER.
APPLICATION FILED MAY 24, 1902.

NO MODEL.

WITNESSES:
D. E. Carlsen.
E. C. Carlsen

INVENTOR.
Michael Derrig.
BY his ATTORNEY.
A. M. Carlsen.

UNITED STATES PATENT OFFICE.

MICHAEL DERRIG, OF MAPLETON, NORTH DAKOTA.

BARREL-HOLDER.

SPECIFICATION forming part of Letters Patent No. 720,681, dated February 17, 1903.

Application filed May 24, 1902. Serial No. 108,881. (No model.)

*To all whom it may concern:*

Be it known that I, MICHAEL DERRIG, a citizen of the United States, residing at Mapleton, in the county of Cass and State of North Dakota, have invented certain new and useful Improvements in Barrel-Holders; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to devices for holding barrels in an elevated position while their contents are being tapped out; and the main object of the invention is to provide a device by which a barrel may be easily placed at any desired elevation, either in a standing or lying position, and, if necessary, tilted, so as to readily get a can or measure under the faucet or tap by which the barrel is emptied. This and other objects I attain by the novel construction and arrangement of parts illustrated in the accompanying drawings, in which—

Figure 1:
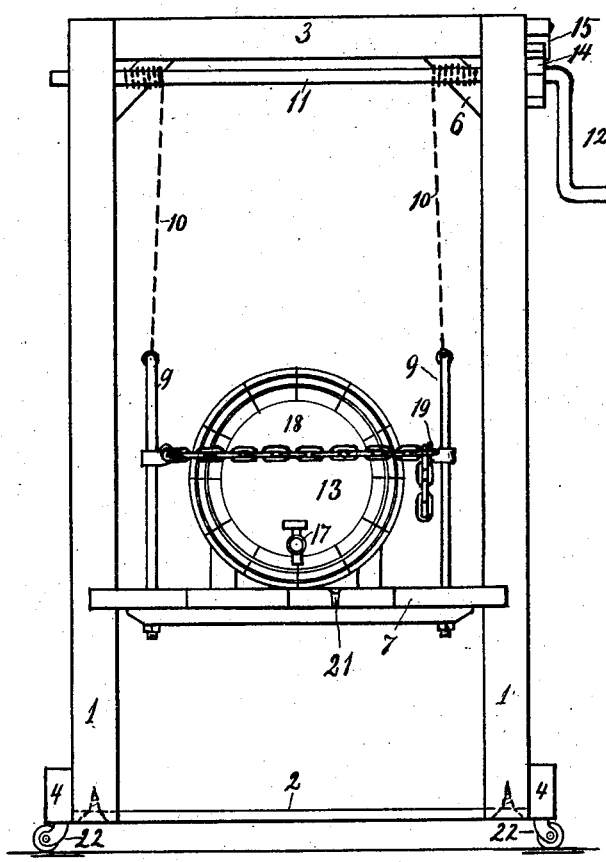
Figure 2:
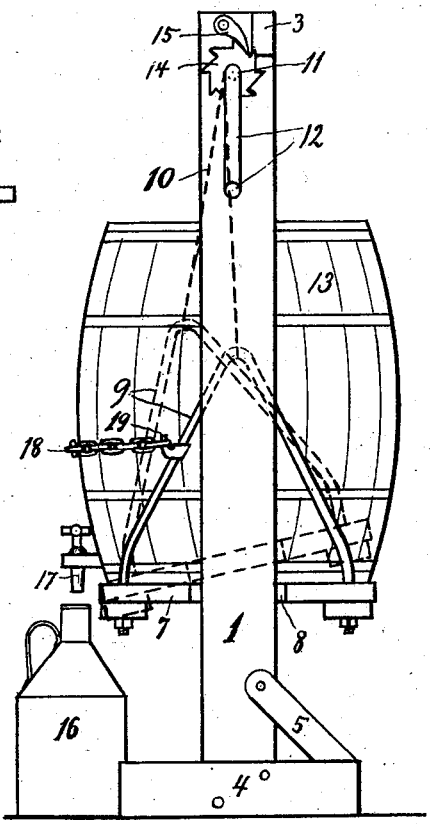
Figure 3:
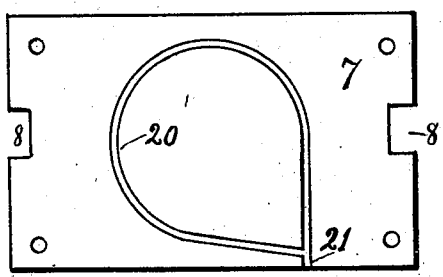

Figure 1 is a front elevation of my barrel-holder. Fig. 2 is a side view of the same with the casters removed and the barrel standing, while in Fig. 1 it is placed in a horizontal position. Fig. 3 is a top view of the platform 7 only.

Referring to the drawings by reference-numerals, 1 1 are two uprights secured together by the bottom bar 2 and top bar 3 and provided with horizontal foot-pieces 4, to which 5 are braces, while similar braces 6 give firmness to the upper part of the frame.

Guided by the uprights 1 is a platform 7, having wide notches 8, straddling the uprights so loosely that the platform may be tilted considerably, as shown in dotted lines in Fig. 2, when it is desired to have the barrel tilted, so as to empty it more completely.

The platform 7 is provided with two upwardly-pointing bails 9, from the tops of which extend ropes or chains 10, the upper ends of which are secured to and wound onto a shaft 11, journaled in the two uprights and provided with a hand-crank 12, by which the platform and the barrel 13 placed thereon may easily be elevated.

On the shaft 11 is secured a ratchet-wheel 14, in which engages the dog 15, so as to hold the platform and barrel at any desired elevation.

16 represents a five-gallon can placed under the faucet 17 in Fig. 2 to indicate that any-sized can in practical use may be filled from a barrel supported by my device.

18 is a chain secured with one end to one of the bails 9 and having one of its links placed upon a hook 19, secured on the opposite bail. The chain is thus stretched across the front side or end of the barrel to prevent it from sliding too far forward when it is partly moved forward, so as to thereby cause it and the platform to tilt partly forward for the purpose of fully emptying the barrel, as already stated.

The operation of the device is already fairly explained, still it may be added that when a barrel in a store or saloon is to be tapped the platform 7 is lowered down on the floor, the barrel is then rolled upon it and placed in the desired position, and elevated by the crank 12 and tapped. This can be done by one person with ease, which is a great advantage in stores where help is often scarce. Another advantage is that by having the barrel suspended on a tilting platform one may easily place underneath the barrel a vessel for saving or gathering the oil or other liquid which often leaks from the barrels and makes the floor very unpleasant to walk on. In order to so gather the leaked-out liquid more easily and completely, I provide the platform with a groove 20 in its upper side. This groove encircles the central portion of the platform where the barrel rests and terminates in a single mouth or outlet 21, under which a vessel may be placed to receive the leakage. If molasses or other liquid gets stiff or frozen in winter, the device may be moved on its casters 22 to a stove and away again.

Having thus described my invention, what I claim, and desire to secure by Letters Patent, is—

A barrel-holder comprising a frame or stand, a platform guided to move vertically in the frame, bails projecting upwardly from the platform, a revoluble shaft in the upper part of the frame and provided with a hand-crank, ropes or chains secured to the shaft and to the bails of the platform, and means for locking the shaft with the platform at different elevations, said platform having a play enabling it to be tilted or inclined forward, and means for retaining the barrel on it when inclined, said platform also having the groove 20 21 in its upper side.

In testimony whereof I affix my signature in presence of two witnesses.

MICHAEL DERRIG.

Witnesses:
H. OTOS,
W. A. MATSON.